(12) United States Patent
Oie

(10) Patent No.: US 12,494,499 B2
(45) Date of Patent: Dec. 9, 2025

(54) ELECTROLYTE SHEET FOR SOLID OXIDE FUEL CELL, AND SINGLE CELL FOR SOLID OXIDE FUEL CELL

(71) Applicant: Murata Manufacturing Co., Ltd., Nagaokakyo (JP)

(72) Inventor: Hirofumi Oie, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 625 days.

(21) Appl. No.: 17/589,024

(22) Filed: Jan. 31, 2022

(65) Prior Publication Data

US 2022/0158210 A1    May 19, 2022

Related U.S. Application Data

(63) Continuation of application No. PCT/JP2020/029971, filed on Aug. 5, 2020.

(30) Foreign Application Priority Data

Aug. 6, 2019 (JP) ................................. 2019-144727

(51) Int. Cl.
H01M 8/1253 (2016.01)

(52) U.S. Cl.
CPC ................................. H01M 8/1253 (2013.01)

(58) Field of Classification Search
CPC .................... H01M 8/1253; H01M 2008/1293
See application file for complete search history.

(56) References Cited

U.S. PATENT DOCUMENTS

| | | | | |
|---|---|---|---|---|
| 7,303,833 B2 * | 12/2007 | Cortright | ........... | H01M 8/1213 |
| | | | | 429/495 |
| 8,703,346 B2 * | 4/2014 | Satake | ............. | C04B 35/62655 |
| | | | | 429/479 |
| 2012/0021304 A1 | 1/2012 | Satake et al. | | |
| 2018/0339945 A1 | 11/2018 | Baba | | |
| 2020/0203748 A1* | 6/2020 | Aikawa | ................ | C04B 35/486 |

FOREIGN PATENT DOCUMENTS

| | | |
|---|---|---|
| CN | 102349184 A | 2/2012 |
| JP | 2010192194 A | 9/2010 |
| JP | 2016126883 A | 7/2016 |
| JP | 2018199598 A | 12/2018 |
| WO | WO-2008054774 A2 * | 5/2008 ............ B23K 26/40 |

OTHER PUBLICATIONS

Clarivate Analytics machine translation of JP 2016-126883 A (Year: 2016).*
International Search Report issued for PCT/JP2020/029971, date of mailing Oct. 13, 2020.

* cited by examiner

*Primary Examiner* — Kevin E Yoon
(74) *Attorney, Agent, or Firm* — ArentFox Schiff LLP

(57) ABSTRACT

An electrolyte sheet for solid oxide fuel cells, the electrolyte sheet including a ceramic plate body having a first main surface and a second main surface, wherein the first main surface and the second main surface include scattered recesses, and the recesses on one or both of the first main surface and the second main surface have an arithmetic average depth of 0.25 μm to 4.0 μm and a number density of one million recesses/cm² to 100 million recesses/cm².

14 Claims, 3 Drawing Sheets

ELECTROLYTE SHEET FOR SOLID OXIDE FUEL CELL, AND SINGLE CELL FOR SOLID OXIDE FUEL CELL

CROSS REFERENCE TO RELATED APPLICATIONS

The present application is a continuation of International application No. PCT/JP2020/029971, filed Aug. 5, 2020, which claims priority to Japanese Patent Application No. 2019-144727, filed Aug. 6, 2019, the entire contents of each of which are incorporated herein by reference.

FIELD OF THE INVENTION

The present invention relates to an electrolyte sheet for solid oxide fuel cells and a unit cell for solid oxide fuel cells.

BACKGROUND OF THE INVENTION

A solid oxide fuel cell (SOFC) is a device that produces electric energy through reactions of $H_2 + O^{2-} \rightarrow H_2O + 2e^-$ at the fuel electrode and $(½)O_2 + 2e^- \rightarrow O^{2-}$ at the air electrode. A solid oxide fuel cell is a stack of unit cells each including an electrolyte sheet made of a ceramic plate body and a fuel electrode and an air electrode that are formed on the electrolyte sheet.

The surfaces of an electrolyte sheet for solid oxide fuel cells are sometimes roughened to increase the area of contact between the electrodes and gas and thus increase the power generation efficiency of a solid oxide fuel cell with the electrolyte sheet.

For example, Patent Literature 1 discloses a method of producing a ceramic plate body by stacking a resin sheet or a resin layer on a surface of an unsintered plate body using a resin slurry containing a spherical resin powder, and compression-bonding the stack to form recesses on the surface of the unsintered plate body.
Patent Literature 1: JP 2018-199598 A

SUMMARY OF THE INVENTION

The method of producing a ceramic plate body in Patent Literature 1 is described to provide a ceramic plate body having a high flatness. This means that the recesses on the ceramic plate body are shallow even though the number of the recesses is large, because a spherical resin powder is not likely to be buried under the surface of the unsintered plate body for the ceramic plate body. Such a ceramic plate body does not significantly increase the power generation efficiency of the solid oxide fuel cell with the ceramic plate body.

A solid oxide fuel cell is used in a stack structure with unit cells each including an electrolyte sheet made of a ceramic plate body and a fuel electrode and an air electrode that are formed on the electrolyte sheet. In such a stack structure, recesses that are too deep on the electrolyte sheets may cause load concentration on the projections on the electrolyte sheets and cause breakage of the electrolyte sheets, meaning that the strength of the electrolyte sheets may decrease.

The present invention was made to solve the above problem, and aims to provide an electrolyte sheet for solid oxide fuel cells which has high strength and is capable of increasing the power generation efficiency of a solid oxide fuel cell with the electrolyte sheet. Furthermore, the present invention aims to provide a unit cell for solid oxide fuel cells which includes the electrolyte sheet for solid oxide fuel cells.

The electrolyte sheet for solid oxide fuel cells of the present invention includes a ceramic plate body having a first main surface and a second main surface, wherein the first main surface and the second main surface include scattered recesses, and the recesses on one or both of the first main surface and the second main surface have an arithmetic average depth of 0.25 μm to 4.0 μm and a number density of one million recesses/cm² to 100 million recesses/cm².

The unit cell for solid oxide fuel cells of the present invention includes: a fuel electrode; an air electrode; and the electrolyte sheet for solid oxide fuel cells of the present invention between the fuel electrode and the air electrode.

The present invention can provide an electrolyte sheet for solid oxide fuel cells which has high strength and is capable of increasing the power generation efficiency of a solid oxide fuel cell with the electrolyte sheet. Furthermore, the present invention aims to provide a unit cell for solid oxide fuel cells which includes the electrolyte sheet for solid oxide fuel cells.

DETAILED DESCRIPTION OF THE PREFERRED EMBODIMENTS

The electrolyte sheet for solid oxide fuel cells (hereinafter, also referred to as the electrolyte sheet) of the present invention and the unit cell for solid oxide fuel cells (hereinafter, also referred to as the unit cell) of the present invention are described below. The present invention is not limited to the following preferred embodiments, and may be suitably modified without departing from the gist of the present invention. Combinations of two or more preferred features described in the following preferred features are also within the scope of the present invention.

The drawings are schematic drawings, and the dimensions, the aspect ratio, the scale, and other parameters may differ from those of the actual products.

Electrolyte Sheet for Solid Oxide Fuel Cells

Figure 1:
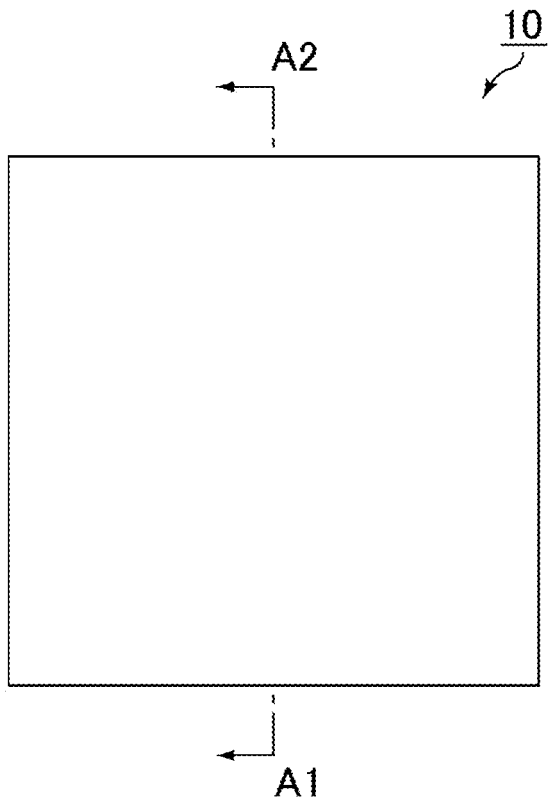
FIG. 1 is a schematic plan view of an example of an electrolyte sheet for solid oxide fuel cells of the present invention.
Figure 2:
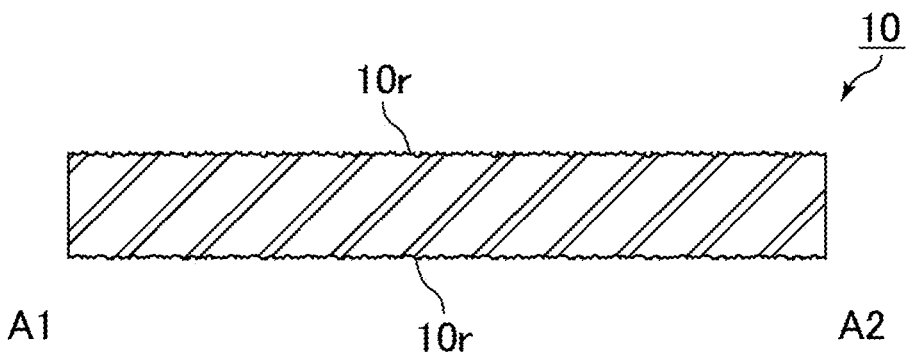
FIG. 2 is a schematic cross-sectional view of a portion taken along line A1-A2 in FIG. 1.

An example of the electrolyte sheet for solid oxide fuel cells of the present invention is described below. FIG. 1 is a schematic plan view of an example of an electrolyte sheet for solid oxide fuel cells of the present invention. FIG. 2 is a schematic cross-sectional view of a portion taken along line A1-A2 in FIG. 1.

An electrolyte sheet 10 for solid oxide fuel cells shown in FIG. 1 and FIG. 2 is made of a ceramic plate body.

The ceramic plate body contains, for example, a sintered body of a solid electrolyte such as scandia-stabilized zirconia or yttria-stabilized zirconia.

In a plan view from a thickness direction of the electrolyte sheet 10 (vertical direction in FIG. 2), the electrolyte sheet 10 has a square shape as shown in FIG. 1.

In a plan view from the thickness direction, preferably, the electrolyte sheet 10 has a substantially rectangular shape with rounded corners, more preferably a substantially square shape with rounded corners, although not shown. In this case, all the corners may be rounded or some corners may be rounded.

Preferably, the electrolyte sheet 10 is provided with a through hole penetrating the electrolyte sheet 10 in the thickness direction, although not shown. Such a through hole functions as a gas flow path in a solid oxide fuel cell.

One through hole or two or more through holes may be provided.

In a plan view from the thickness direction, a through hole may have a circular shape or any other shape.

Such a through hole may be provided at any position.

The electrolyte sheet 10 has a thickness of preferably 200 µm or less, more preferably 130 µm or less. Also, the electrolyte sheet 10 has a thickness of preferably 30 µm or more, more preferably 50 µm or more.

The thickness of the electrolyte sheet 10 is determined as follows. First, the thickness is measured at randomly selected nine sites within a region excluding the portions 5 mm inside the peripheral edges of the sheet with a U-shape Frame Sheet Metal Micrometer (available from Mitutoyo Corporation, PMU-MX). The average of the thicknesses measured at the nine sites is calculated. The average is taken as the thickness of the electrolyte sheet 10.

As shown in FIG. 2, the electrolyte sheet 10 has a first main surface and a second main surface each including scattered recesses 10r.

The recesses 10r have an arithmetic average depth of 0.25 µm to 4.0 µm. The recesses 10r have an arithmetic average depth of 0.25 µm to 4.0 µm on one or both of the first main surface and the second main surface of the electrolyte sheet 10, and preferably have an arithmetic average depth of 0.25 µm to 4.0 µm on each of the first main surface and the second main surface of the electrolyte sheet 10. The recesses 10r having an arithmetic average depth of less than 0.25 µm decrease the power generation efficiency of a solid oxide fuel cell with the electrolyte sheet 10. The recesses 10r having an arithmetic average depth of more than 4.0 µm decrease the strength of the electrolyte sheet 10. The recesses 10r preferably have an arithmetic average depth of 1 µm to 3 µm.

The arithmetic average depth of the recesses 10r is measured with a scanning probe microscope (AFM mode) of "Dimension Icon" available from Bruker Japan K.K. as the surface roughness of the central area on one or both of the first main surface and the second main surface of the electrolyte sheet 10. The arithmetic average depth is measured with a microscopic field of 30 µm×30 µm, a scanning speed of 24 µm/s, and a frequency of 0.4 Hz.

The recesses 10r have a number density of one million recesses/$cm^2$ to 100 million recesses/$cm^2$. The recesses 10r have a number density of one million recesses/$cm^2$ to 100 million recesses/$cm^2$ on one or both of the first main surface and the second main surface of the electrolyte sheet 10, and preferably have a number density of one million recesses/$cm^2$ to 100 million recesses/$cm^2$ on each of the first main surface and the second main surface of the electrolyte sheet 10. The recesses 10r having a number density of less than one million recesses/$cm^2$ decrease the power generation efficiency of a solid oxide fuel cell with the electrolyte sheet 10. The recesses 10r having a number density of more than 100 million recesses/$cm^2$ cause the electrolyte sheet 10 to have a small surface area due to an increase in number of shallow recesses 10r, which decreases the power generation efficiency of a solid oxide fuel cell with the electrolyte sheet 10. The recesses 10r preferably have a number density of one million recesses/$cm^2$ to 20 million recesses/$cm^2$, more preferably one million recesses/$cm^2$ to 10 million recesses/$cm^2$.

The number density of the recesses 10r is determined as follows. First, in measuring the arithmetic average depth of the recesses 10r as described above, the number of the recesses 10r in a 30-µm-square area is counted based on the contrast between light and dark areas within the microscopic field (30 µm×30 µm). The number of the recesses 10r in a 1-cm-square area calculated from the counting result is defined as the number density of the recesses 10r.

Being provided with the recesses 10r having an arithmetic average depth and a number density falling within the respective ranges above, the electrolyte sheet 10 has high strength and is capable of increasing the power generation efficiency of a solid oxide fuel cell with the electrolyte sheet.

Method of Producing Electrolyte Sheet for Solid Oxide Fuel Cells

The electrolyte sheet for solid oxide fuel cells of the present invention is produced by the following method, for example.

Producing Ceramic Green Sheet

Figure 3:
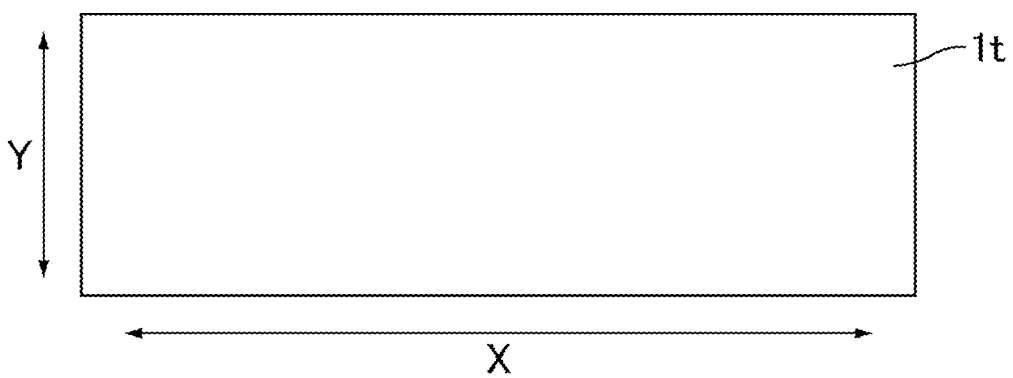
FIG. 3 is a schematic plan view of an example of producing ceramic green sheets.
Figure 4:
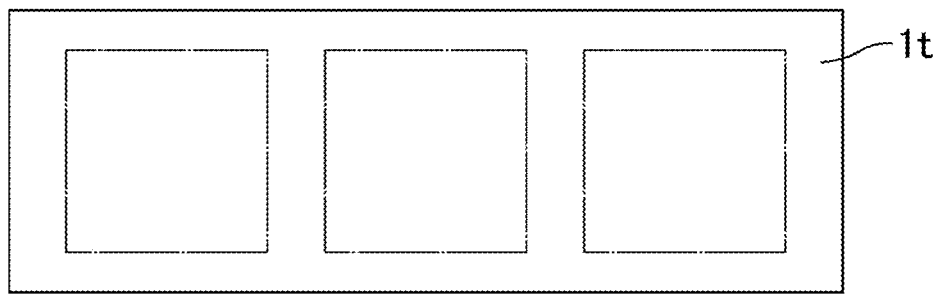
FIG. 4 is another schematic plan view of the example of producing ceramic green sheets.
Figure 5:
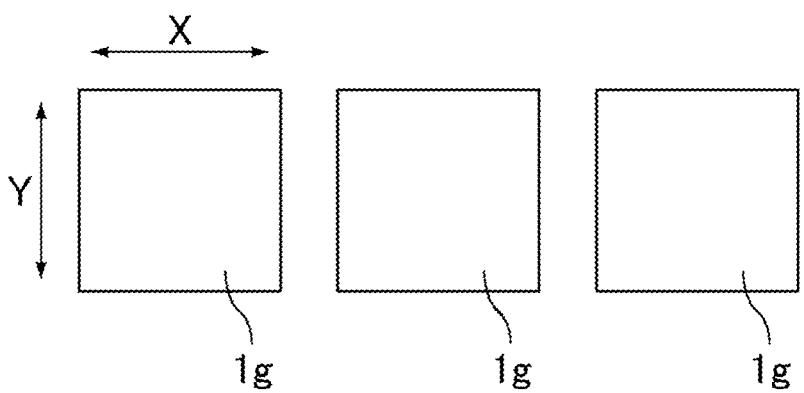
FIG. 5 is yet another schematic plan view of the example of producing ceramic green sheets.

FIG. 3 is a schematic plan view of an example of producing ceramic green sheets. FIG. 4 is another schematic plan view of the example of producing ceramic green sheets. FIG. 5 is yet another schematic plan view of the example of producing ceramic green sheets.

A ceramic material powder, a binder, a plasticizer, a dispersant, an organic solvent, and the like are suitably mixed to prepare a ceramic slurry. A first main surface of a carrier film is coated with the obtained ceramic slurry to produce ceramic green tape 1t as shown in FIG. 3.

The ceramic green tape 1t is preferably produced by tape casting, particularly preferably doctor blading or calendaring. FIG. 3 shows the casting directions for the tape casting by X and the directions perpendicular to the casting directions by Y.

The ceramic material powder used is, for example, a solid electrolyte powder such as scandia-stabilized zirconia powder or yttria-stabilized zirconia powder.

Preferably, the ceramic slurry contains a plasticizer. Containing a plasticizer, the ceramic slurry is soft and thus provides a soft unsintered plate body.

The resulting ceramic green tape 1t is punched to obtain pieces having a predetermined size by a known technique as shown in FIG. 4. The pieces are removed from the carrier film and ceramic green sheets 1g are produced as shown in FIG. 5. Punching of the ceramic green tape 1t and removal of the punched-out pieces from the carrier film may be performed in any order.

Producing Unsintered Plate Body

Figure 6:
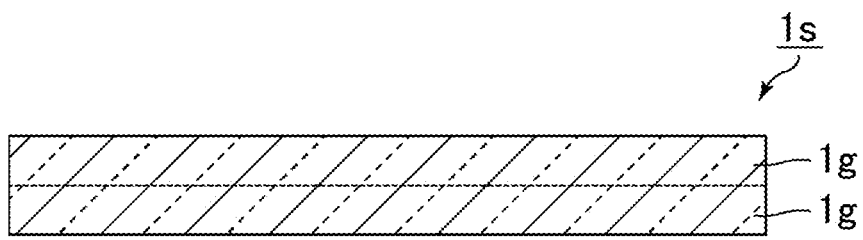
FIG. 6 is a schematic cross-sectional view of an example of producing an unsintered plate body.

FIG. 6 is a schematic cross-sectional view of an example of producing an unsintered plate body.

As shown in FIG. 6, an unsintered plate body 1s is produced by stacking two ceramic green sheets 1g and compression-bonding the stack.

The number of ceramic green sheets 1g used to produce the unsintered plate body 1s may be two as shown in FIG. 6, or may be three or more. The ceramic green sheets 1g may be compression-bonded, or may simply be stacked on one another without being compression-bonded. When the unsintered plate body 1s includes a plurality of ceramic green sheets 1g, the thickness of a ceramic plate body to be obtained can be controlled as appropriate in a simple manner.

The unsintered plate body 1s may be produced using one ceramic green sheet 1g. In this case, the step shown in FIG. 6 is omitted.

Forming Resin Layer

Figure 7:
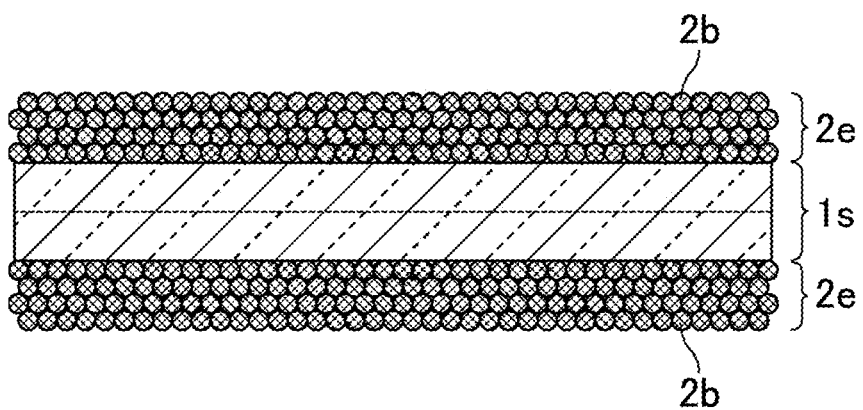
FIG. 7 is a schematic cross-sectional view of an example of forming a resin layer.

FIG. 7 is a schematic cross-sectional view of an example of forming a resin layer.

The resin powder 2b, a binder, a dispersant, an organic solvent, and the like are suitably mixed to prepare a resin slurry. Then, as shown in FIG. 7, a first main surface (the top surface in FIG. 7) and a second main surface (the bottom surface in FIG. 7) of the unsintered plate body 1s are coated with the obtained resin slurry to form resin layers 2e on the first main surface and the second main surface of the unsintered plate body 1s.

The resin powder 2b is preferably made of a resin material that is poorly soluble in an organic solvent used in production of a resin slurry. The expression "poorly soluble in an organic solvent" herein means that when 0.1 g of a resin powder and 100 g of an organic solvent are mixed at room temperature (25° C.) for 24 hours, there remains a visually observable residue. The organic solvent used to prepare a resin slurry is, for example, at least one solvent (alone or in a mixture) selected from toluene, ethanol, isopropanol, butyl acetate, ethyl acetate, terpineol, and water. In this case, the resin powder 2b is made of a crosslinked acrylic resin, for example.

Preferably, the resin powder 2b has a spherical shape as shown in FIG. 7. When having a spherical shape, the resin powder 2b preferably has a median size $D_{50}$ of more than 0.5 µm and less than 10 µm.

When the resin powder 2b has a spherical shape, the median size $D_{50}$ of the resin powder 2b is defined as the particle size at 50% in a cumulative particle size distribution curve of the resin powder 2b expressed as cumulative percentage against particle size scale. The particle size distribution of the resin powder 2b is measured with, for example, a laser diffraction particle size distribution measuring device. The median size $D_{50}$ used here is the equivalent spherical diameter because the resin powder 2b may have a shape distorted through the production processes.

When the resin layers 2e are formed, resin sheets may be disposed instead of application of a resin slurry. A resin sheet is obtained by coating a first main surface of a carrier film with a resin slurry prepared by suitably mixing the resin powder 2b, a binder, a dispersant, an organic solvent, and the like.

Preferably, each of the resin layers 2e has a thickness of 3 µm to 30 µm. With the thickness of the resin layer 2e falling within the range above, the thermal energy used to burn off the resin layer 2e in the later-described producing a ceramic plate body is small, so that the firing time can be shortened.

Producing Unsintered Body

Figure 8:
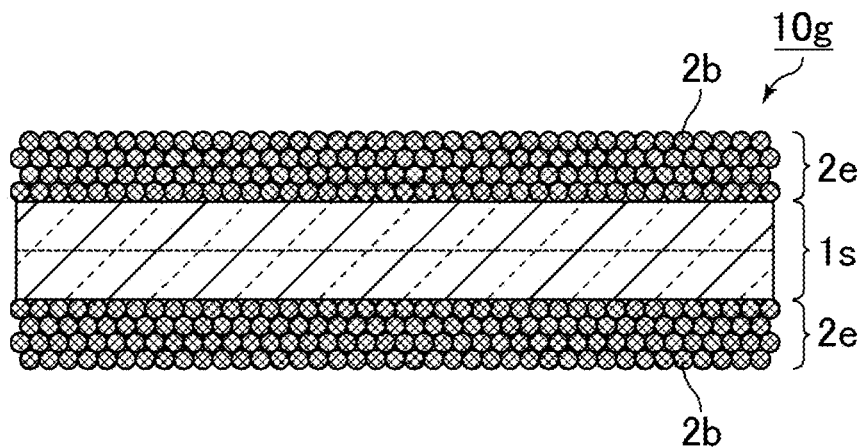
FIG. 8 is a schematic cross-sectional view of an example of producing an unsintered body.

FIG. 8 is a schematic cross-sectional view of an example of producing an unsintered body.

As shown in FIG. 8, an unsintered body 10g is produced by pressing together the unsintered plate body 1s and the resin layers 2e on the first main surface and the second main surface of the unsintered plate body 1s.

When the unsintered plate body 1s and the resin layers 2e on the first main surface and the second main surface of the unsintered plate body 1s are pressed together, the resin layers 2e are pressed onto the first main surface and the second main surface of the unsintered plate body 1s. This forms many scattered recesses having a shape derived from the shape of the resin powder 2b on the first main surface and the second main surface of the unsintered plate body 1s. The number density of the recesses formed on the unsintered plate body 1s can be controlled by adjusting the size (for example, median size $D_{50}$) of the resin powder 2b.

In pressing together the unsintered plate body 1s and the resin layers 2e on the first main surface and the second main surface of the unsintered plate body 1s, increasing the heating temperature softens the unsintered plate body 1s. When the unsintered plate body 1s is soft, the resin powder 2b in the resin layers 2e is apt to be buried under the first main surface and the second main surface of the unsintered plate body 1s. Thus, deep recesses are scatteredly formed on the first main surface and the second main surface of the unsintered plate body 1s. From this viewpoint, the heating temperature in pressing together the unsintered plate body 1s and the resin layers 2e is preferably 70° C. or higher, more preferably 80° C. or higher. Also, the heating temperature in pressing together the unsintered plate body 1s and the resin layers 2e is preferably 90° C. or lower.

As described above, adding a plasticizer to the ceramic slurry used to produce a ceramic green sheet 1g in the unsintered plate body 1s also softens the unsintered plate body 1s, thus scatteredly forming deep recesses on the first main surface and the second main surface of the unsintered plate body 1s. From this viewpoint, the plasticizer content in the ceramic slurry is preferably 2 wt % or more. The plasticizer content in the ceramic slurry is also preferably 6 wt % or less.

The arithmetic average depth of the recesses to be formed on the unsintered plate body 1s can be controlled by adjusting the size (for example, median size $D_{50}$) of the resin powder 2b or by, as described above, adjusting the heating temperature in pressing together the unsintered plate body 1s and the resin layers 2e, the plasticizer content in the ceramic slurry used to produce a ceramic green sheet 1g, or the like.

Forming Through Hole in Unsintered Body

Although not shown, the unsintered body 10g may be provided with a through hole that penetrates the unsintered body 10g in the stacking direction of the ceramic green sheets.

The through hole is preferably formed by drilling. In this case, the unsintered body 10g is drilled from its first main surface to second main surface or vice versa such that the through hole penetrating the unsintered body 10g in the stacking direction is formed. The drilling may be performed under any conditions.

One through hole may be formed or two or more through holes may be formed.

No through hole may be formed. In this case, the forming a through hole is omitted.

Producing Ceramic Plate Body

Figure 9:
FIG. 9 is a schematic cross-sectional view of an example of producing a ceramic plate body.

FIG. 9 is a schematic cross-sectional view of an example of producing a ceramic plate body.

As shown in FIG. 9, a ceramic plate body 10p is produced by burning off the resin layers 2e and sintering the unsintered plate body 1s through firing the unsintered body 10g.

When the unsintered body 10g is provided with a through hole, the ceramic plate body 10p is provided with a through hole penetrating therethrough in a thickness direction thereof.

Preferably, the firing the unsintered body 10g includes degreasing and sintering.

Thus, the ceramic plate body 10p having a first main surface and a second main surface each including scattered recesses is produced. The method of producing an electrolyte sheet described above includes controlling the size (for example, median size $D_{50}$) of the resin powder 2b in the resin layers 2e, the heating temperature when the unsintered plate body 1s and the resin layers 2e are pressed together, the plasticizer content in the ceramic slurry used to produce a ceramic green sheet 1g, and the like. The ceramic plate body 10p is therefore provided with recesses having an arithmetic average depth of 0.25 μm to 4.0 μm and a number density of one million recesses/cm$^2$ to 100 million recesses/cm$^2$. In other words, the method of producing an electrolyte sheet described above can provide the electrolyte sheet for solid oxide fuel cells of the present invention including the ceramic plate body 10p (for example, the electrolyte sheet 10 in FIG. 1 and FIG. 2).

Unit Cell for Solid Oxide Fuel Cells

Figure 10:
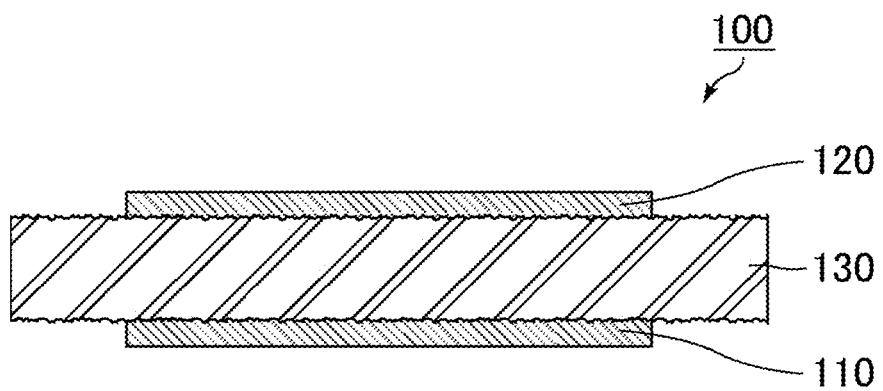
FIG. 10 is a schematic cross-sectional view of an example of a unit cell for solid oxide fuel cells of the present invention.

The following describes an example of the unit cell for solid oxide fuel cells of the present invention. FIG. 10 is a schematic cross-sectional view of an example of a unit cell for solid oxide fuel cells of the present invention.

As shown in FIG. 10, a unit cell 100 for solid oxide fuel cells includes a fuel electrode 110, an air electrode 120, and an electrolyte sheet 130. The electrolyte sheet 130 is disposed between the fuel electrode 110 and the air electrode 120.

The fuel electrode 110 may be a known fuel electrode for solid oxide fuel cells.

The air electrode 120 may be a known air electrode for solid oxide fuel cells.

The electrolyte sheet 130 is the electrolyte sheet for solid oxide fuel cells of the present invention (for example, the electrolyte sheet 10 in FIG. 1 and FIG. 2). The unit cell 100 is therefore capable of increasing the power generation efficiency of a solid oxide fuel cell with the unit cell.

Method of Producing Unit Cell for Solid Oxide Fuel Cells

The unit cell for solid oxide fuel cells of the present invention is produced by the following method, for example.

First, a slurry for a fuel electrode and a slurry for an air electrode are prepared. The slurry for a fuel electrode is prepared by mixing a powder of a material of a fuel electrode with a binder, a dispersant, a solvent, and the like as appropriate. The slurry for an air electrode is prepared by mixing a powder of a material of an air electrode with a binder, a dispersant, a solvent, and the like as appropriate.

The material of a fuel electrode may be a known material of a fuel electrode for solid oxide fuel cells.

The material of an air electrode may be a known material of an air electrode for solid oxide fuel cells.

The binder, dispersant, solvent, and other additives in a slurry for a fuel electrode may be those known in a method of forming a fuel electrode for solid oxide fuel cells. The binder, dispersant, solvent, and other additives in a slurry for an air electrode may be those known in a method of forming an air electrode for solid oxide fuel cells.

Then, a first main surface of the electrolyte sheet is coated with the slurry for a fuel electrode to a predetermined thickness and a second main surface of the electrolyte sheet is coated with the slurry for an air electrode to a predetermined thickness. These coating films are dried to form a green layer for a fuel electrode and a green layer for an air electrode.

The green layer for a fuel electrode and the green layer for an air electrode are then fired to form a fuel electrode and an air electrode. The firing conditions such as the firing temperature may be determined as appropriate depending on the material and the like of the fuel electrode or the air electrode.

EXAMPLES

Examples that more specifically disclose the electrolyte sheet for solid oxide fuel cells of the present invention are described below. The present invention is not limited to these examples.

Example 1

An electrolyte sheet of Example 1 was produced by the following method.

Producing Ceramic Green Sheet

Scandia-stabilized zirconia powder, a binder, a plasticizer, a dispersant, and an organic solvent were compounded at a predetermined ratio. The organic solvent used was a 7:3 mixture by weight of toluene and ethanol. The compounded product was stirred with a medium made of partially stabilized zirconia at 1000 rpm for three hours to form a ceramic slurry. The plasticizer content in the ceramic slurry was 4 wt %.

The ceramic slurry was formed into a sheet on a first main surface of a carrier film made of polyethylene terephthalate by a known technique of tape casting to give a ceramic green tape.

The ceramic green tape was punched by a known technique into pieces having a predetermined size and removed from the carrier film. Thus, ceramic green sheets were produced.

Producing Unsintered Plate Body

An unsintered plate body was produced by stacking two ceramic green sheets and compression-bonding the stack.

Forming Resin Layer

A resin powder, a binder, a dispersant, and an organic solvent were compounded at a predetermined ratio. The resin powder used was a spherical resin powder made of a crosslinked acrylic resin and having a median size $D_{50}$ of 1 μm. The organic solvent used was a 7:3 mixture by weight of toluene and ethanol. The compounded product was stirred with a medium made of partially stabilized zirconia at 1000 rpm for three hours to form a ceramic slurry.

The resin slurry was applied by printing to a first main surface and a second main surface of the unsintered plate body and then dried to form resin layers on the first main surface and the second main surface of the unsintered plate body.

Producing Unsintered Body

The unsintered plate body and the resin layers on the first main surface and the second main surface of the unsintered plate body were pressed together to produce an unsintered body. The pressing was performed at a heating temperature of 80° C. and a pressing force of 1500 kgf/cm$^2$.

Producing Ceramic Plate Body

The unsintered body was fired in a furnace as follows. The unsintered body was degreased by holding the unsintered body at 400° C. for a predetermined time. The degreased unsintered body was sintered by holding the unsintered body at 1400° C. for five hours. Firing the unsintered body as described above burned off the resin layers and sintered the unsintered plate body to produce a ceramic plate body. The resulting ceramic plate body had a thickness of 90 µm.

Thus, an electrolyte sheet (ceramic plate body) of Example 1 was produced.

Example 2

An electrolyte sheet of Example 2 was produced by the same procedure as for the electrolyte sheet of Example 1, except that the median size $D_{50}$ of the resin powder in the resin slurry was changed to 3 µm.

Example 3

An electrolyte sheet of Example 3 was produced by the same procedure as for the electrolyte sheet of Example 1, except that the median size $D_{50}$ of the resin powder in the resin slurry was changed to 5 µm.

Example 4

An electrolyte sheet of Example 4 was produced by the same procedure as for the electrolyte sheet of Example 1, except that the median size $D_{50}$ of the resin powder in the resin slurry was changed to 7 µm.

Comparative Example 1

An electrolyte sheet of Comparative Example 1 was produced by the same procedure as for the electrolyte sheet of Example 1, except that the conditions were changed to the following conditions.

No plasticizer was added to the ceramic slurry.

The median size $D_{50}$ of the resin powder in the resin slurry was 0.3 µm.

The heating temperature in pressing together the unsintered plate body and the resin layers in the producing an unsintered body was 50° C.

Comparative Example 2

An electrolyte sheet of Comparative Example 2 was produced by the same procedure as for the electrolyte sheet of Example 1, except that the conditions were changed to the following conditions.

No plasticizer was added to the ceramic slurry.

The median size $D_{50}$ of the resin powder in the resin slurry was 0.5 µm.

The heating temperature in pressing together the unsintered plate body and the resin layers in the producing an unsintered body was 50° C.

Comparative Example 3

An electrolyte sheet of Comparative Example 3 was produced by the same procedure as for the electrolyte sheet of Example 1, except that the median size $D_{50}$ of the resin powder in the resin slurry was changed to 10 µm.

Evaluation

The electrolyte sheets of Examples 1 to 4 and Comparative Examples 1 to 3 were subjected to the following evaluations.

The arithmetic average depth and the number density of the recesses in the electrolyte sheet of each of Examples 1 to 4 and Comparative Examples 1 to 3 were measured by the above methods. Table 1 shows the results.

The electrolyte sheets of Examples 1 to 4 and Comparative Examples 1 to 3 were subjected to a four-point bending test using a precision universal tester "AGS-X" available from Shimadzu Corporation to determine the strength. Specifically, each electrolyte sheet was placed on the lower jigs such that the lower jigs were 32.5 mm apart from each other relative to the center of the electrolyte sheet. The upper jigs were placed 65 mm apart from each other relative to the center of the electrolyte sheet. The upper jigs were lowered from above onto the electrolyte sheet at a rate of 5 mm/min to measure the strength of the electrolyte sheet. Table 1 shows the results. The evaluation criteria were as follows.

Excellent: the strength was 200 MPa or more.
Good: the strength was 160 MPa to less than 200 MPa.
Poor: the strength was less than 160 MPa.

TABLE 1

|  | Electrolyte sheet thickness (µm) | Resin powder median size $D_{50}$ (µm) | Recess arithmetic average depth (µm) | Recess number density (recesses/cm$^2$) | Strength |
| --- | --- | --- | --- | --- | --- |
| Comparative Example 1 | 90 | 0.3 | 0.1176 | 100 million or more | Excellent |
| Comparative Example 2 | 90 | 0.5 | 0.1960 | 100 million or more | Excellent |
| Example 1 | 90 | 1 | 0.2970 | 90 to 100 million | Excellent |
| Example 2 | 90 | 3 | 1.2560 | 10 to 20 million | Excellent |
| Example 3 | 90 | 5 | 2.0933 | 2 to 6 million | Excellent |
| Example 4 | 90 | 7 | 3.3188 | 1 to 2.5 million | Good |
| Comparative Example 3 | 90 | 10 | 4.6266 | 300 to 900 thousand | Poor |

As shown in Table 1, the electrolyte sheets of Examples 1 to 4 were each provided with recesses having an arithmetic average depth of 0.25 µm to 4.0 µm and a number density of one million recesses/cm$^2$ to 100 million recesses/cm$^2$. The electrolyte sheets of Examples 1 to 4 therefore had high strength. Each of the electrolyte sheets of Examples 1 to 4, when incorporated into a solid oxide fuel cell, presumably, has a large area of contact between the electrodes and gas, and thus ultimately increases the power generation efficiency of the solid oxide fuel cell.

As shown in Table 1, the electrolyte sheets of Comparative Examples 1 and 2 both had high strength, but were provided with recesses having an arithmetic average depth of less than 0.25 µm. Each of the electrolyte sheets of Comparative Examples 1 and 2, when incorporated into a solid oxide fuel cell, presumably therefore has a small area of contact between the electrodes and gas, and thus ultimately decreases the power generation efficiency of the solid oxide fuel cell.

As shown in Table 1, the electrolyte sheet of Comparative Example 3 was provided with recesses having an arithmetic average depth of more than 4.0 µm and a number density of less than one million recesses/cm$^2$, and thus had low strength.

REFERENCE SIGNS LIST 1g ceramic green sheet
1s unsintered plate body
1t ceramic green tape
2b resin powder
2e resin layer
10, 130 electrolyte sheet for solid oxide fuel cells (electrolyte sheet)
10g unsintered body
10p ceramic plate body
10r recess
100 unit cell for solid oxide fuel cells (unit cell)
110 fuel electrode
120 air electrode
X casting directions
Y directions perpendicular to casting directions

The invention claimed is:

1. An electrolyte sheet for solid oxide fuel cells, the electrolyte sheet comprising:
a ceramic plate body having a first main surface and a second main surface,
wherein the first main surface and the second main surface include scattered recesses, at least some of the recesses overlap each other, and the recesses on one or both of the first main surface and the second main surface have an arithmetic average depth of 0.25 µm to 4.0 µm and a number density of one million recesses/cm$^2$ to 100 million recesses/cm$^2$.

2. The electrolyte sheet for solid oxide fuel cells according to claim 1, wherein the number density is one million recesses/cm$^2$ to 20 million recesses/cm$^2$.

3. The electrolyte sheet for solid oxide fuel cells according to claim 2, wherein the number density is one million recesses/cm$^2$ to 10 million recesses/cm$^2$.

4. The electrolyte sheet for solid oxide fuel cells according to claim 1, wherein the ceramic plate body has a thickness of 200 µm or less.

5. The electrolyte sheet for solid oxide fuel cells according to claim 4, wherein the thickness of the ceramic plate body is 30 µm to 200 µm.

6. The electrolyte sheet for solid oxide fuel cells according to claim 1, wherein the ceramic plate body is a sintered body of a solid electrolyte.

7. The electrolyte sheet for solid oxide fuel cells according to claim 6, wherein the solid electrolyte is scandia-stabilized zirconia or yttria-stabilized zirconia.

8. The electrolyte sheet for solid oxide fuel cells according to claim 1, wherein the electrolyte sheet includes a through hole penetrating the electrolyte sheet in the thickness direction.

9. The electrolyte sheet for solid oxide fuel cells according to claim 1, wherein the arithmetic average depth is 0.2970 µm to 3.3188 µm.

10. A unit cell for solid oxide fuel cells, the unit cell comprising:
a fuel electrode;
an air electrode; and
the electrolyte sheet according to claim 1 between the fuel electrode and the air electrode.

11. The unit cell for solid oxide fuel cells according to claim 10, wherein the number density is one million recesses/cm$^2$ to 20 million recesses/cm$^2$.

12. The unit cell for solid oxide fuel cells according to claim 11, wherein the number density is one million recesses/cm$^2$ to 10 million recesses/cm$^2$.

13. The unit cell for solid oxide fuel cells according to claim 10, wherein the electrolyte sheet includes a through hole penetrating the electrolyte sheet in the thickness direction.

14. The unit cell for solid oxide fuel cells according to claim 10, wherein the arithmetic average depth is 0.2970 µm to 3.3188 µm.

* * * * *